United States Patent
Kong et al.

(10) Patent No.: US 11,986,967 B2
(45) Date of Patent: May 21, 2024

(54) APPARATUS FOR TREATING SUBSTRATE AND METHOD FOR DETECTING STATE OF SUBSTRATE

(71) Applicant: SEMES CO., LTD., Cheonan-si (KR)

(72) Inventors: Tae Kyung Kong, Cheonan-si (KR); Jin Sung Sun, Cheonan-si (KR)

(73) Assignee: Semes Co., Ltd., Chungcheongnam-do (KR)

(*) Notice: Subject to any disclaimer, the term of this patent is extended or adjusted under 35 U.S.C. 154(b) by 275 days.

(21) Appl. No.: 17/679,279

(22) Filed: Feb. 24, 2022

(65) Prior Publication Data
US 2022/0379485 A1 Dec. 1, 2022

(30) Foreign Application Priority Data
May 27, 2021 (KR) .................. 10-2021-0068065

(51) Int. Cl.
*B25J 5/02* (2006.01)
*B25J 9/16* (2006.01)
*B25J 11/00* (2006.01)

(52) U.S. Cl.
CPC ............ *B25J 9/1697* (2013.01); *B25J 5/02* (2013.01); *B25J 9/1664* (2013.01); *B25J 9/1674* (2013.01); *B25J 11/0095* (2013.01)

(58) Field of Classification Search
CPC .... B25J 9/1697; B25J 9/1664; B25J 11/0095; B25J 5/02; B25J 9/1674; B25J 9/042;
(Continued)

(56) References Cited

U.S. PATENT DOCUMENTS 11,158,079 B2 * 10/2021 Kwon ................ G06T 7/11
2020/0083070 A1 * 3/2020 Clark ............ H01L 21/76834
(Continued)

FOREIGN PATENT DOCUMENTS

JP     2008080466 A    4/2008
JP     2018162122 A    10/2018
(Continued)

OTHER PUBLICATIONS

Jasper et al., CameraMan—Robot Cell with Flexible Vision Feedback for Automated Nanohandling inside SEMs, 2007, IEEE, p. 51-56 (Year: 2007).*
(Continued)

*Primary Examiner* — McDieunel Marc
(74) *Attorney, Agent, or Firm* — Harness, Dickey & Pierce, P.L.C.

(57) ABSTRACT

The inventive concept provides a substrate treating apparatus. The substrate treating apparatus includes a plurality of treating chambers performing a respective treatment on a substrate therein; a transfer chamber having a robot transferring the substrate between the plurality of treating chambers; a detection unit mounted on the robot and configured to detect a substrate state; and a controller for controlling the detection unit, wherein the detection unit comprises: an imaging member for imaging the substrate; and a driving member for moving the imaging member, and wherein the controller controls the detection unit to image and store an image of the substrate at an optimal position and determines whether an image of the substrate is a normal state based on the image obtained in the optimal position, the optimal position determined based on a process variable of the treating chamber.

12 Claims, 15 Drawing Sheets

(58) Field of Classification Search
CPC ........... G05B 2219/45031; G05B 2219/37224; G05B 2219/37608
See application file for complete search history.

(56) References Cited

U.S. PATENT DOCUMENTS

2020/0167946 A1* 5/2020 Kwon ................... G06T 7/0006
2022/0384147 A1* 12/2022 Lee ................... H01J 37/32036

FOREIGN PATENT DOCUMENTS

| KR | 10-2006-0070706 A | 6/2006 |
| KR | 10-2011-0089645 A | 8/2011 |
| KR | 102156896 B1 | 9/2020 |
| KR | 102210515 B1 | 2/2021 |

OTHER PUBLICATIONS

Fatikow et al., CameraMan: A multirobot system for nanohandling in a scanning electron microscope, 2008, IEEE, p. 437-442 (Year: 2008).*
Fisher et al., A Biochip Microarray Fabrication System Using Inkjet Technology, 2007, IEEE, p. 488-500 (Year: 2007).*
Li et al., Study of DNA properties under controlled conditions using AFM based nano-robotics, 2007, IEEE, p. 1018-1021 (Year: 2007).*
Korean Office Action dated Oct. 6, 2022 issued in corresponding Korean Appln. No. 10-2021-0068065.
Notice of Allowance dated May 11, 2023, issued in corresponding Korean Patent Application No. 10-2021-0068065.

* cited by examiner

APPARATUS FOR TREATING SUBSTRATE AND METHOD FOR DETECTING STATE OF SUBSTRATE

CROSS-REFERENCE TO RELATED APPLICATIONS

A claim for priority under 35 U.S.C. § 119 is made to Korean Patent Application No. 10-2021-0068065 filed on May 27, 2021, in the Korean Intellectual Property Office, the entire contents of which are hereby incorporated by reference.

BACKGROUND

Embodiments of the inventive concept described herein relate to a substrate treating apparatus including a detection unit mounted on a robot for transferring a substrate and detecting a state of the substrate, and a substrate state detecting method using the same.

In the semiconductor manufacturing process, a photolithography process is a process of forming a desired photoresist pattern by applying a photoresist solution to a substrate and exposing using a photomask and subsequent developing. The photolithography process includes the photoresist solution application process, and the exposure and development processes. Also, a substrate transfer device transfers the substrate to a treating unit (or process chamber) that treats each process.

The substrate transfer device transfers the substrate to each treating unit and then mounts the substrate on a substrate support unit placed in each treating unit, or lifts a substrate that has been treated in each treating unit from the substrate support unit. When the substrate is mounted on or lifted from the substrate support unit, the substrate may be broken or deviate from a correct position. In order to detect such a state of the substrate (e.g., position or posture of the substrate), the substrate transfer device is provided with an imaging member such as a camera for imaging the state of the substrate. However, since the imaging member is provided in a fixed state to the substrate transfer device, some components of the substrate treating apparatus may block the substrate from being exposed to the imaging member, thereby blocking imaging of the substrate in some instance.

SUMMARY

Embodiments of the inventive concept provide a substrate treating apparatus and a substrate state detecting method for moving an imaging member for imaging a state of a substrate to an optimal position for imaging the substrate in order to detect the state of the substrate, thereby imaging the state of the substrate at a suitable position, when transferring the substrate.

The technical objectives of the inventive concept are not limited to the above-mentioned ones, and the other unmentioned technical objects will become apparent to those skilled in the art from the following description.

The inventive concept provides a substrate treating apparatus. The substrate treating apparatus includes a plurality of treating chambers performing a respective treatment on a substrate therein; a transfer chamber having a robot transferring the substrate between the plurality of treating chambers; a detection unit mounted on the robot and configured to detect a substrate state; and a controller for controlling the detection unit, wherein the detection unit comprises: an imaging member for imaging the substrate; and a driving member for moving the imaging member, and wherein the controller controls the detection unit to image and store an image of the substrate at an optimal position and determines whether an image of the substrate is a normal state based on the image obtained in the optimal position, the optimal position determined based on a process variable of the treating chamber.

In an embodiment, the detection unit further comprises an alarm unit for generating an alarm when the controller determines that an alignment of the substrate is not in a normal state.

In an embodiment, the controller controls the detection unit to image the substrate while moving around a periphery of the optimal position when an alignment of the substrate is determined to out of the normal state.

In an embodiment, the process variable comprises a position of the robot within the transfer chamber.

In an embodiment, the process variable comprises a type of a substrate support unit provided within the treating chamber.

In an embodiment, the controller controls such that the driving member moves completely before the substrate is mounted on the substrate support unit by the robot.

In an embodiment, the controller controls such that the driving member moves completely before the substrate is lifted from the substrate support unit by the robot.

In an embodiment, the controller controls the driving member such that the imaging member is moved to the optimal position while the robot is moving.

In an embodiment, the imaging member is provided to image a top surface or a bottom surface of the substrate.

In an embodiment, the optimal position is determined based on an image capturable area of the substrate by the imaging member.

In an embodiment, the robot comprises a hand holding the substrate thereon; and a support supporting the hand, wherein the detection unit is provided at the support.

In an embodiment, the driving member further comprises a driving rail coupled to the support, and the imaging member moves up and down along the driving rail.

The inventive concept provides a method for detecting a substrate state using a substrate treating apparatus, wherein the substrate treating apparatus comprises: a plurality of treating chambers performing a respective treatment on a substrate therein; a transfer chamber having a robot transferring the substrate between the plurality of treating chambers; and an imaging member mounted on the robot and configured to moved upwardly and downwardly and image the substrate state and wherein the method comprises: determining an optimal position for imaging the substrate based on a process variable of the treating chamber; imaging and storing an image of the substrate at the optimal position by the imaging member; and determining whether an alignment of the substrate is in a normal state based on the image captured by the imagining member.

In an embodiment, the method for detecting the substrate state further comprises generating an alarm when the alignment of the substrate is not in the normal state.

In an embodiment, the method for detecting the substrate state further comprises moving the imaging member upwardly and downwardly around the optimal position when the alignment of the substrate is determined to be out of the normal state.

In an embodiment, the process variable comprises a position of the robot within the transfer chamber.

In an embodiment, the process variable comprises a type of a substrate support unit provided within the treating chamber.

In an embodiment, a movement of the imaging unit is completed before the substrate is mounted on the substrate support unit by the robot.

In an embodiment, a movement of the imaging unit is completed before the substrate is lifted from the substrate support unit by the robot.

In an embodiment, the imaging member is moved to the optimal position while the robot is moving.

According to an embodiment of the inventive concept, when a substrate is transferred, an imaging member for imaging a state of the substrate in order to detect the state of the substrate is moved to an optimal position for imaging the substrate, thereby imaging the state of the substrate at a suitable position.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
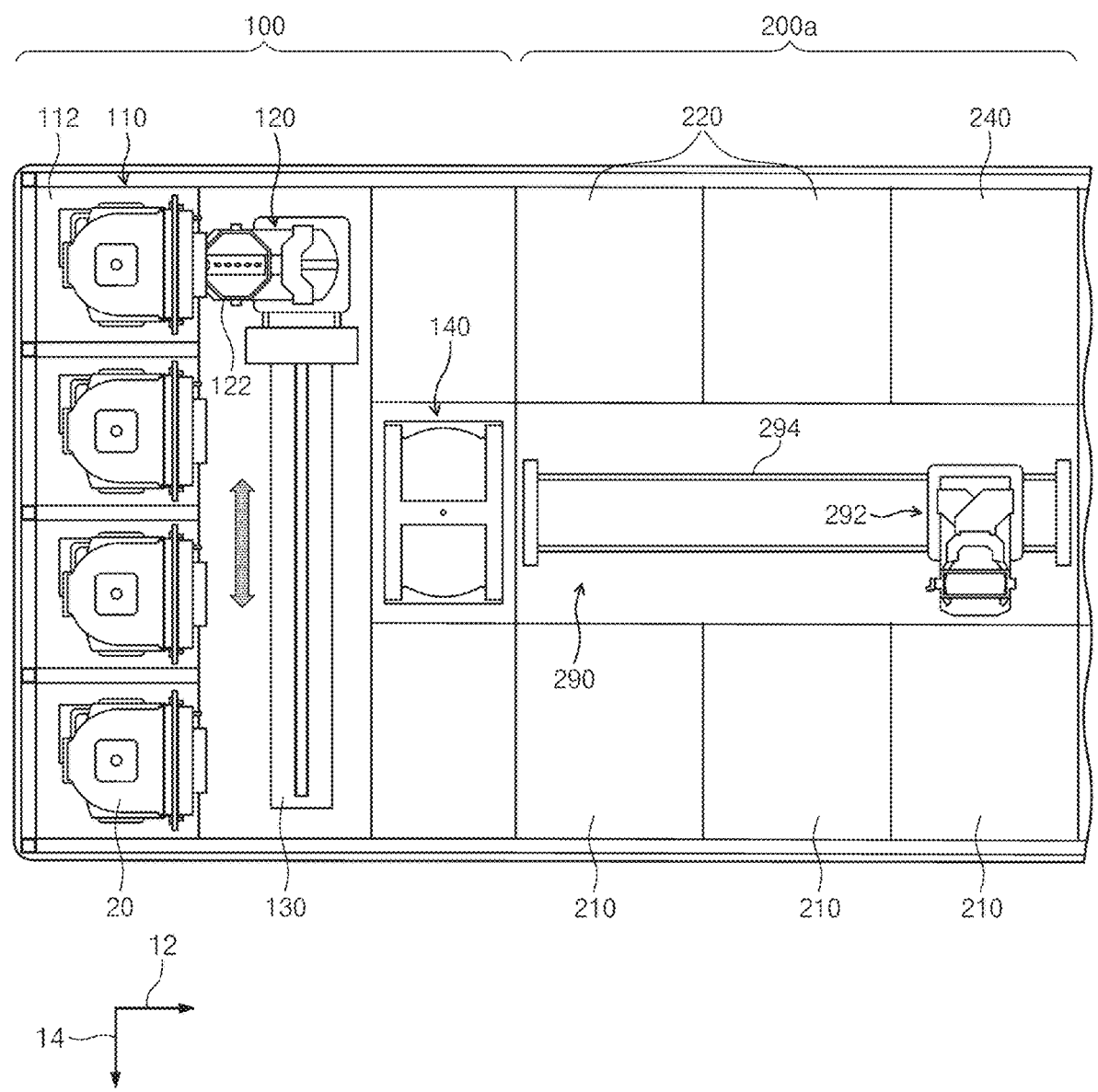
FIG. 1 is a perspective view of a substrate treating facility according to an embodiment of the inventive concept.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

A facility of this embodiment is described as being used to perform a photolithography process on a substrate such as a semiconductor wafer or a flat panel, but this is for convenience of explanation and the inventive concept may also be used in other devices including a robot transferring the substrate to treat the substrate.

Figure 2:
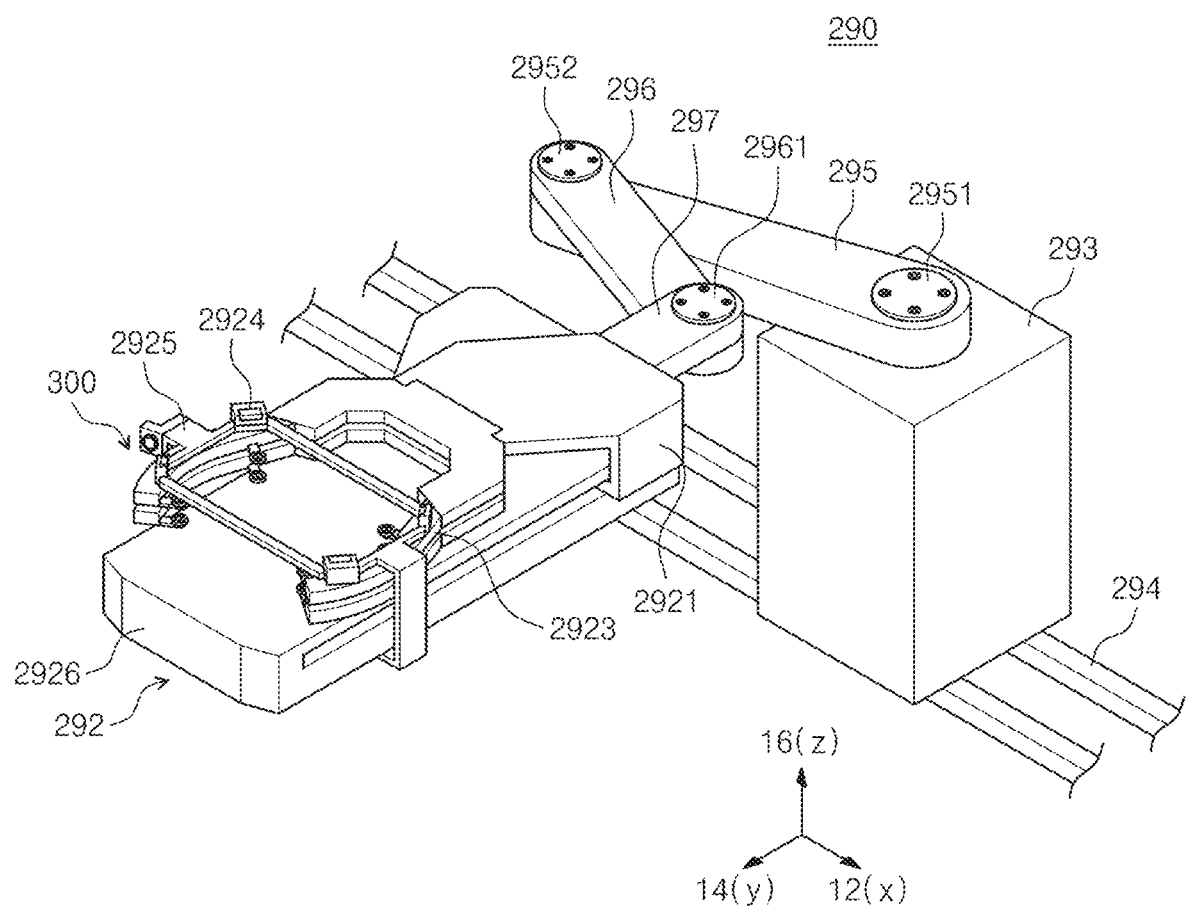
FIG. 2 is a perspective view illustrating an embodiment of the robot of FIG. 1.

FIG. 1 is a perspective view of a photolithography facility used in a substrate treating method according to an embodiment of the inventive concept. FIG. 2 is a view illustrating an application treatment unit in the facility of FIG. 1, and FIG. 3 is a view illustrating a development treatment unit in the facility of FIG. 1.

Figure 3:
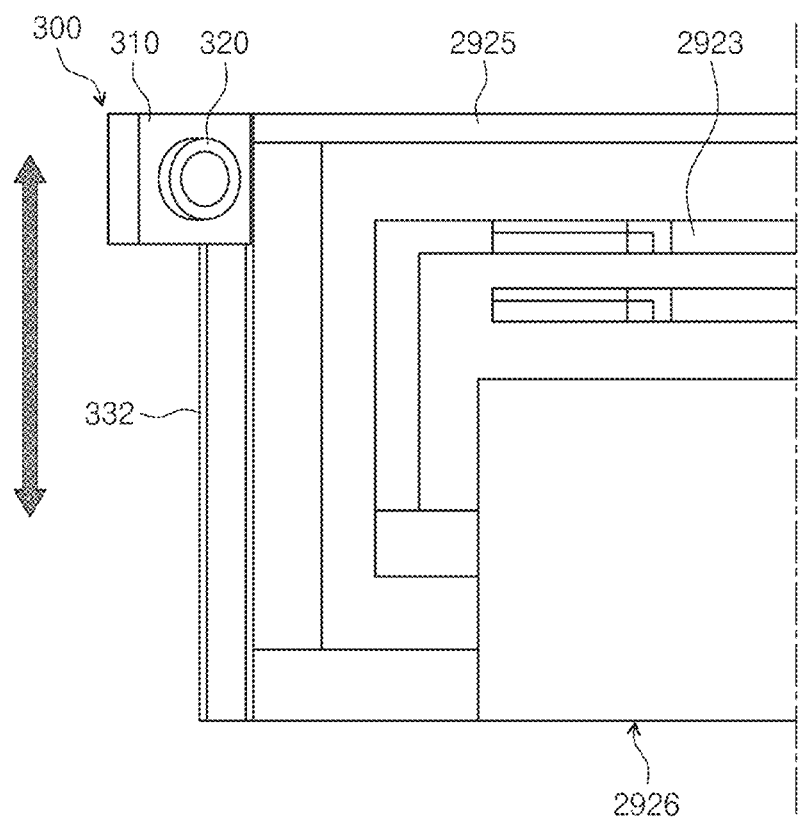
FIG. 3 is a plan view illustrating an embodiment of the detection unit of FIG. 2.

Referring to FIG. 1 to FIG. 3, the substrate treating apparatus 1 includes an index unit 100 and a process treating unit 200a. The index unit 100 and the process treating unit 200a are sequentially arranged in a direction. The direction in which the index unit 100 and the process treating unit 200a will be referred to as a first direction 12, a direction perpendicular to the first direction 12 will be referred to as a second direction 14, and a direction perpendicular to a plane including the first direction 12 and the second direction 14 will be referred to as a third direction 16. The substrate W is moved while being stored in a container 20. In this case, the container 20 has a structure that may be sealed from the outside. For example, as the container 20, a front open unified pod (FOUP) having a door in a front may be used.

In an embodiment, the index unit 100 includes a plurality of load ports 110, an index robot 120, and a first buffer module 140. The load port 110 has a mounting table 112 on which the container 20 in which the substrates W are stored is placed. A plurality of mounting tables 112 are provided, and the mounting tables 112 are arranged sequentially along the second direction 14. In an embodiment, four mounting tables 112 are provided. The mounting table 112 may be provided in a larger or smaller number.

The index robot 120 transfers the substrate W between the container 20 placed on the mounting table 112 of the load port 110 and the first buffer module 140. The index robot 120 has a structure capable of four-axis driving so that a hand 122 directly handling the substrate W may be movable in the first direction 12, the second direction 14, and the third direction 16 and rotatable. A guide rail 130 is provided such that its lengthwise direction is disposed along the second direction 14. The index robot 120 is coupled to the guide rail 130 to be linearly movable along the guide rail 130. Although not shown, the first buffer module 140 may be provided in a rectangular parallelepiped shape capable of temporarily storing a plurality of substrates W, and may be disposed between the index robot 120 and the process treating unit 200a.

In an embodiment, the process treating unit 200a may be provided as an application treatment unit that performs a process of applying a photoresist on the substrate W before an exposure process. The process treating unit 200a includes a process of applying a photoresist solution such as a photoresist to the substrate W, and a heat treatment process such as heating and cooling the substrate W before and after the photoresist application process. The process treating unit 200a includes an application module 220, baking modules 210, cooling modules 240, and a transfer chamber 290.

The transfer chamber 290 and the buffer module 140 are disposed side by side along the first direction 12. The main robot 292 and the guide rail 294 are disposed in the transfer chamber 290. The transfer chamber 290 has a substantially rectangular shape. The main robot 292 transfers the substrate W between the baking module 210, the application module 220, and the cooling module 240 and the first buffer module 140. The guide rail 294 is disposed such that its lengthwise direction is parallel to the first direction 12. The guide rail 294 guides the main robot 292 to move linearly in the first direction 12.

All of the application modules 220 have the same structure. However, the type of a photoresist used in each application module 220 may be different from each other. In an embodiment, a chemical amplification photoresist may be used as the photoresist. The application module 220 applies a photoresist onto the substrate W.

The baking modules 210 heat-treat the substrate W. For example, the baking modules 210 perform processes such as a pre-bake process of removing organic materials or moisture from a surface of the substrate W by heating the substrate W to a preset temperature before applying the photoresist or a soft bake process performed after applying the photoresist on the substrate, and a cooling process of cooling the substrate W after each heating process.

The cooling module 240 cools a substrate on which an application process of a photoresist has been performed at the application module 220, or a substrate heated in the baking module 210 as necessary.

FIG. 2 is a perspective view illustrating an embodiment of the robot of FIG. 1. Hereinafter, the robot of FIG. 2, which is the main robot 292 of FIG. 1 will be described. However, unlike this, the robot may be an index robot 120 and may optionally be another robot provided in the substrate treating apparatus 1.

Referring to FIG. 2, the robot 432 has a hand 2923, an arm 296, a support 295, a base 293, a coupling part 2925, a sensor 2924, and a detection unit 300. The hand 2923 is fixedly installed on the arm 296. The substrate is held on the hand 2923. In an embodiment, a plurality of hands 2923 are provided. For example, two hands 2923 may be provided. The hand 2923 may be provided in a larger or smaller number than this. A plurality of hands 2923 are coupled to the moving part 2921. The moving part 2921 is provided to be movable in a front-back direction y along the rail formed at the support part 2926. The moving part 2921 is coupled to the arm 296 by a connection link 297 and a first connection shaft 2961.

In an embodiment, the connection link 297, the arm 296, and the support 295 are provided as a three-bar link. In an embodiment, the connection link 297 and the arm 296 are connected by the first connection shaft 2961, the arm 296 and the support 295 are connected by the second connection shaft 2952, and the support 295 and base 293 are connected by the third connection shaft 2951. In an embodiment, A coupling structure of the connection link 297, the arm 296, and the support 295 allows the arm 296 to be stretchable and thus the support part 2926 can be movable in the front-back direction y. In an embodiment, each link may be provided to rotate around respective connection shafts 2961, 2952, and 2951. In an embodiment, the support part 2926 is provided to be rotatable 360 degrees by each link and respective connection shaft 2961, 2952, and 2951. In an embodiment, the third connection shaft 2951 moves the support 295 up and down. The base 293 is coupled to the guide rail 294 to be movable along the guide rail 294.

The sensor 2924 detects a position of the substrate on the hand 2923. In an embodiment, a plurality of sensors 2924 are provided. In an embodiment, the sensors 2924 are fixedly mounted to the support part 2926 by the coupling part 2925. The sensors 2924 may detect whether the substrate is placed at the correct position and/or posture on the hand 2923 or whether the substrate is out of the correction position, e.g., shifted or tilted in a specific direction from the correction position and/or posture.

The detection unit 300 images the substrate to detect a state of the substrate. FIG. 3 is a plan view illustrating an embodiment of the detection unit of FIG. 2. Referring to FIG. 3, the detection unit 300 has an imaging member 320 and an alarm unit (not shown). In an embodiment, the imaging member 320 may be installed at the hand 2923 to image the state of a substrate located in a front portion of the hand 2923. In an embodiment, the imaging member 320 may be installed on the mounting member 310 provided to face a front side of the hand 2923. In an embodiment, the mounting member 310 is mounted on a driving rail 332 fixed to the coupling part 2925, so that it can be raised and lowered along the driving rail 332. In an embodiment, a position of the imaging member 320 is determined by a controller (not shown). The alarm unit (not shown) generates an alarm when an alignment of the substrate is not in a normal state. In an embodiment, the alarm unit (not shown) may provide an audible alarm through a speaker or a visual alarm through a display device.

In an embodiment, the imaging member 320 may be provided to image a top surface or a bottom surface of the substrate W. For example, the driving rail 332 extends such that the imaging member 320 installed on the mounting member 310 which is installed on the driving rail 332 images the top surface and/or the bottom surface of the substrate W when the substrate W is placed on the chuck 400 provided in each treating chamber. For example, the treating chamber is a chamber provided in each module such as the first buffer module 140, the baking module 210, and the application module 220 provided in the substrate treating apparatus 1.

Figure 4:
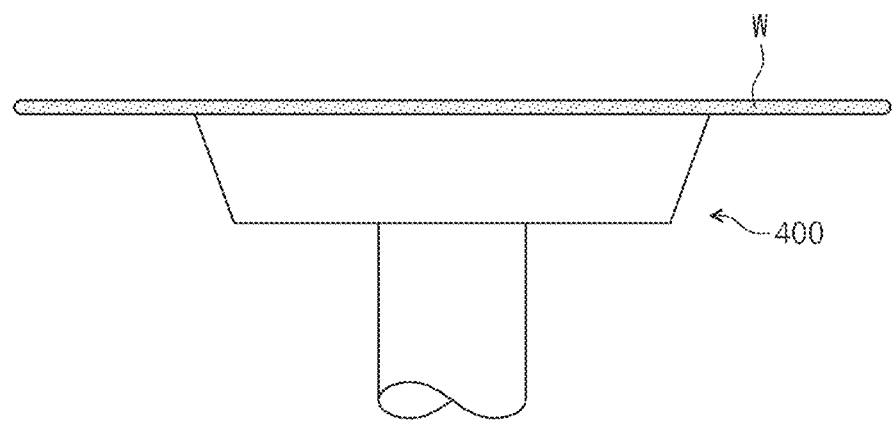
FIG. 4 to FIG. 5 are plan views illustrating an embodiment of a substrate support unit provided in a treating chamber of FIG. 1, respectively.

In an embodiment, the controller may control the driving member so that the imaging member 320 is moved to an optimal position where the substrate W can be imaged according to a process variable of the treating chamber. In an embodiment, the optimal position may be determined based on an area of the substrate W which could be imaged by the imaging member 320. For example, depending on a height at which the imaging member 320 is positioned on the driving rail 332, an area of the substrate W imaged by the imaging member 320 varies. The area of the substrate W which can be imaged by the imaging member 320 may be determined according to a type of the support unit supporting the substrate W, as described below. For example, a process variable may include the type of support unit provided in the treating chamber. For example, as illustrated in FIG. 4, the support unit may be provided as the chuck 400. In an embodiment, the chuck 400 is provided to have a diameter smaller than a diameter of the substrate W. Accordingly, both the top surface and the bottom surface of the substrate W placed on the chuck 400 may be imaged by the imaging member 320. If there is no structure around the chuck 400, it would be advantageous to image the top surface of the substrate W, but in some cases, when there is a structure preventing imaging of the top surface of the substrate W, it is advantageous to image the bottom surface of the substrate W. In an embodiment, when a height of the driving rail 332 cannot be provided high enough, or when a position of the hand 2923 must be low to access the treating chamber, the imaging member 320 may not be positioned high enough to image the top surface of the substrate W. In this case, imaging for detecting the state of the substrate W may be performed by moving the imaging member 320 to a position where the bottom surface of the substrate W may be imaged.

In an embodiment, the process variable may include a position of the robot 292 in the transfer chamber 290. For example, the height of the imaging member 320 may be changed on the driving rail 332 depending on where the robot 292 is located in the transfer chamber 290.

Figure 5:
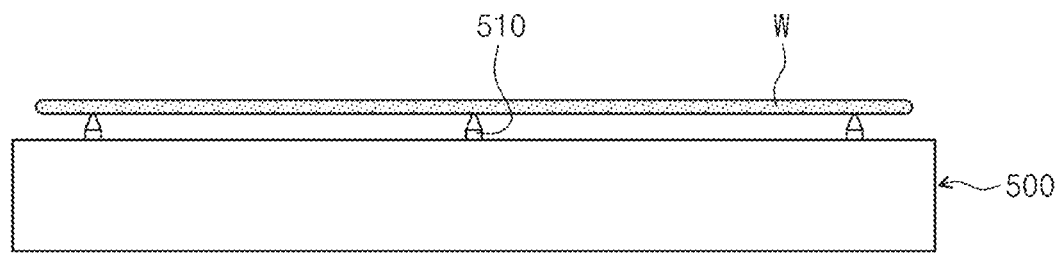

Optionally, the substrate support unit may be provided in the form of a plate 500 as shown in FIG. 5. For example, the plate 500 is provided with a diameter greater than or equal to the diameter of the substrate W. The substrate W is supported by a support pin 510 provided on the plate 500. In this case, it is impossible to image the bottom surface of the substrate W placed on the plate 500. Accordingly, when the substrate support unit is provided in the form of the plate 500, the imaging member 320 is placed at a position capable of imaging the top surface of the substrate W.

The controller collects in advance information on the area of the substrate W that can be imaged by the imaging member 320 according to each height at which the imaging member 320 may be positioned on the driving rail 332. For example, the controller pre-collects information on the area of the substrate W that can be imaged by imaging member 320 according to each height at which the imaging member 320 may be located on the driving rail 332 according to a location of the robot 292 in the transfer chamber 290 and a type of the substrate support unit provided in the treating chamber. Based on this, the height of the imaging member 320 is determined according to the location of the robot 292 in the transfer chamber 290 or the type of the substrate support unit.

FIG. 6 to FIG. 16 schematically show the operation of detecting the state of the substrate W according to the inventive concept. Hereinafter, it will be described that the substrate support unit provided in the first buffer module 140 and the baking module 210 is provided in the form of the substrate support unit as shown in FIG. 4, and the substrate support unit provided in the application module 220 is provided in the form of a plate 500 as shown in FIG. 5. This is only an embodiment for describing a method for detecting a substrate state of the inventive concept, and a substrate support unit of a different type may be provided to each module.

In a substrate state detecting method of this invention, first, the controller (not illustrated) determines the optimal position to image the substrate W, the imaging member 320 images and stores the image of the substrate W at the optimal position, and determines whether the alignment of the substrate W is in a normal state.

For example, an operator visually checks the image captured by the imaging member 320, and when the alignment of the substrate W is not normal, an alarm is generated through the alarm unit. Optionally, the controller compares an image captured by the imaging member 320 with a reference image previously captured to determine whether the alignment of the substrate W is in a normal state. The reference image may be an image when the substrate W is placed at a desired position according to a process.

Figure 6:
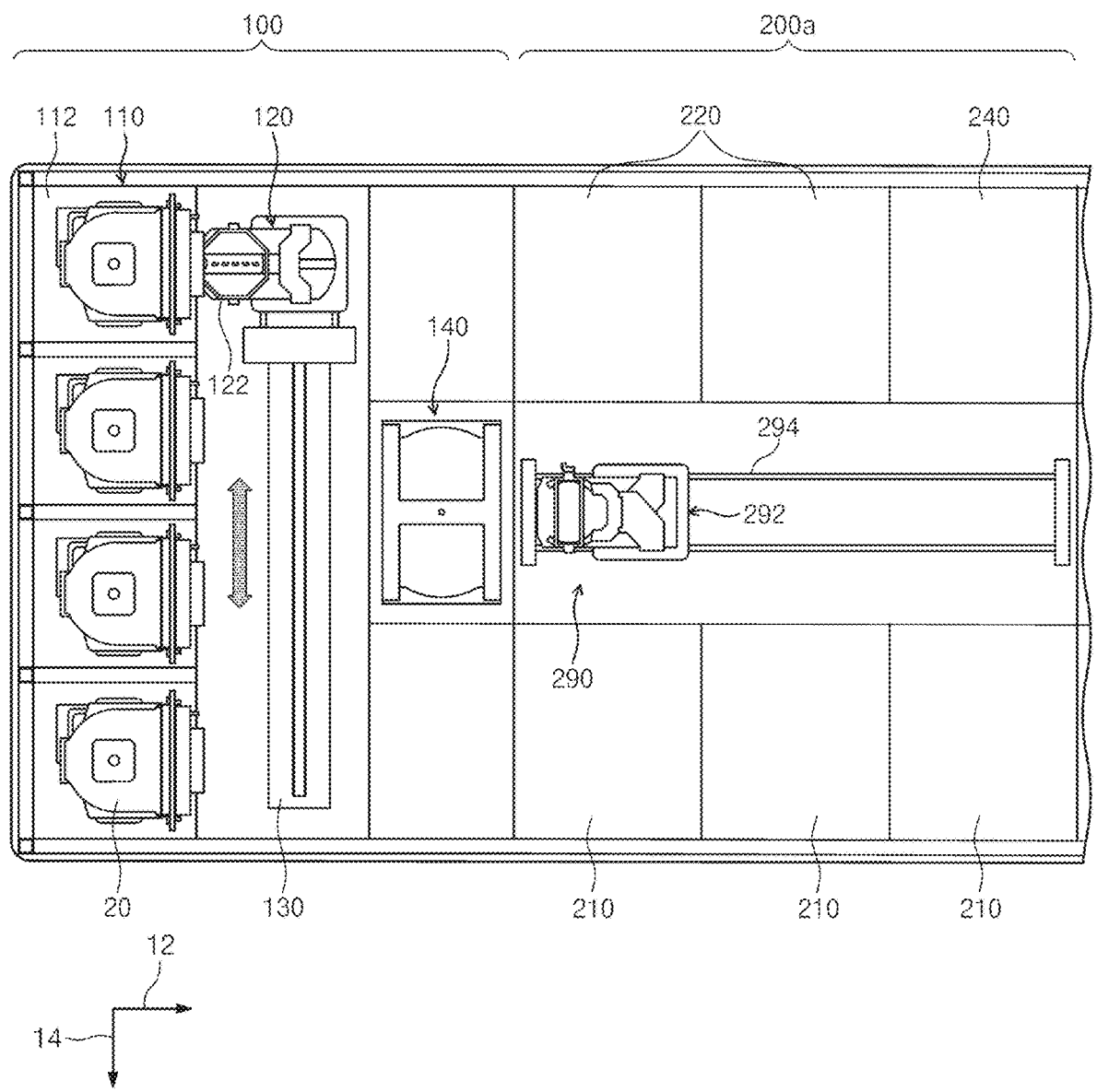
FIG. 6 to FIG. 16 are views illustrating a state of a substrate according to a method of detecting a state of the substrate according to the inventive concept, respectively.
Figure 7:
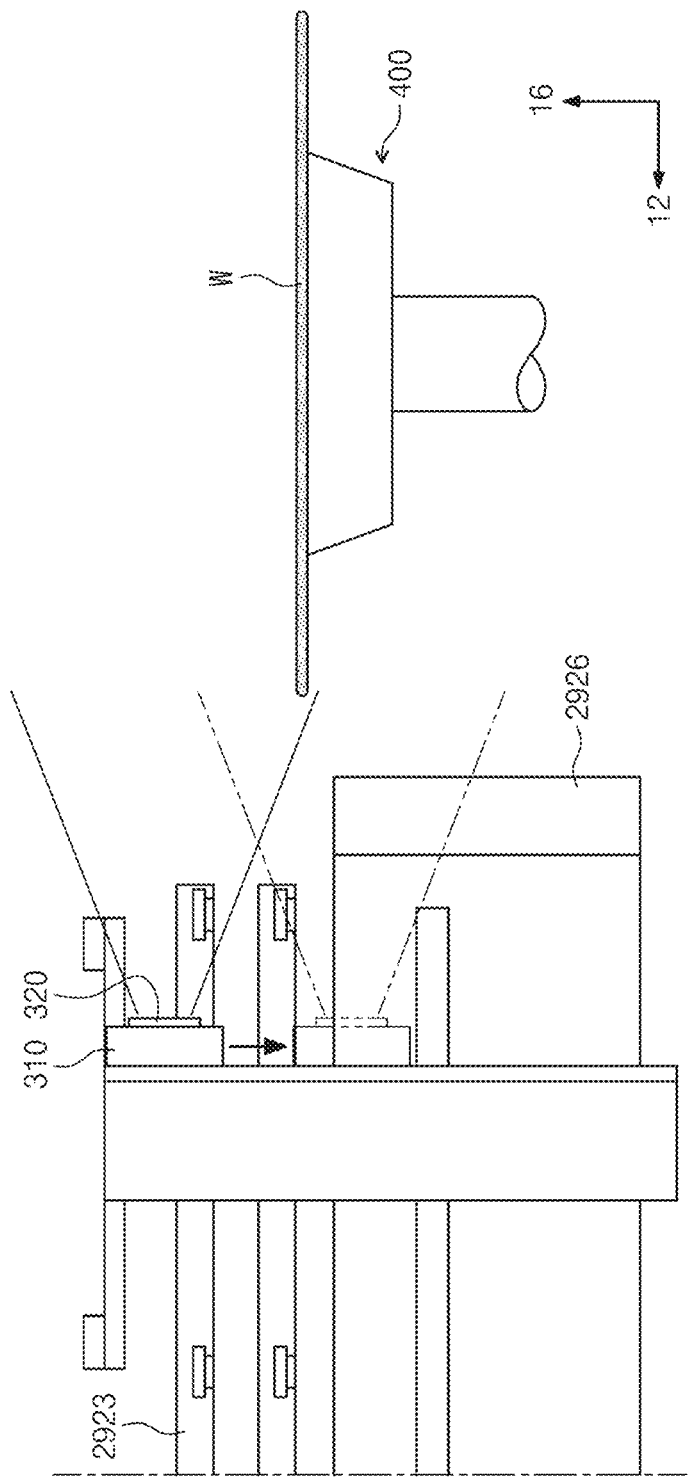
Figure 8:
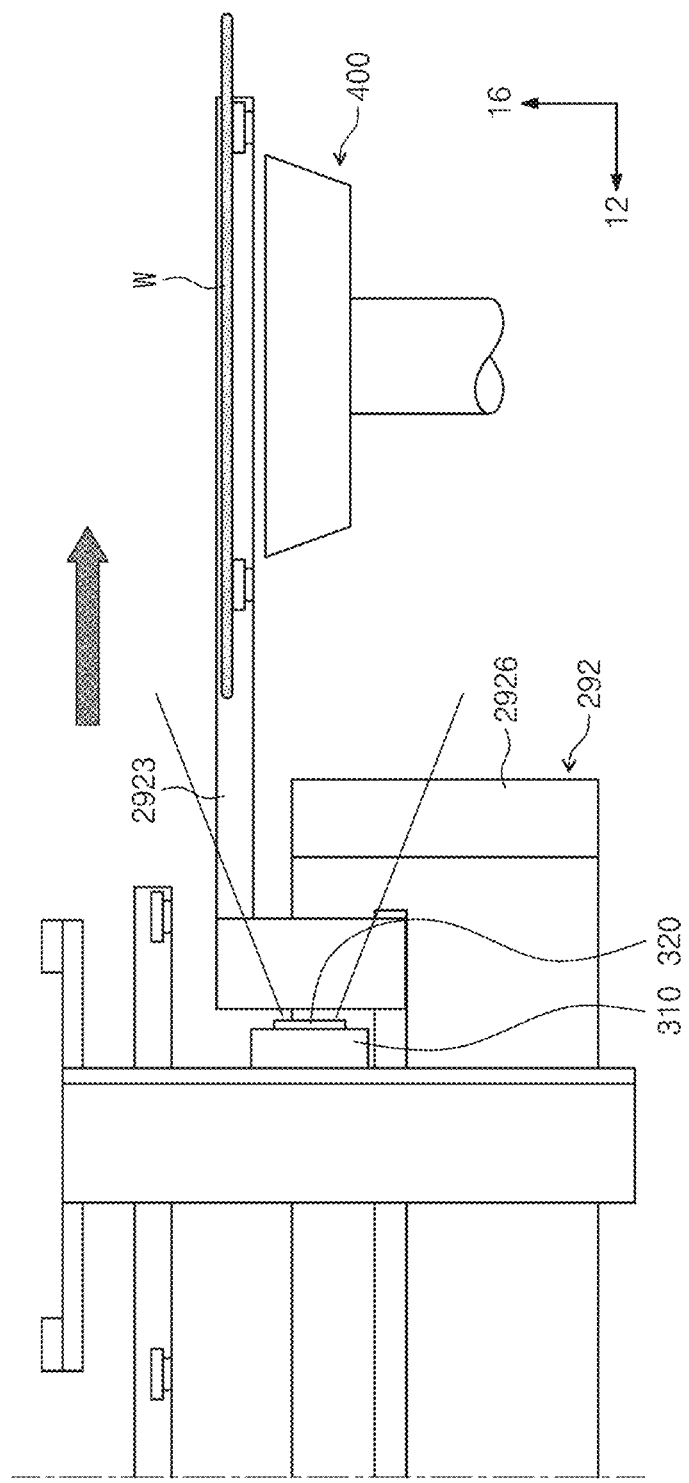

FIG. 6 to FIG. 8 illustrate a method of detecting a substrate state while the substrate W is being carried out from the first buffer module 140.

Referring to FIG. 6, in order to carry out substrate W from the first buffer module 140, the robot 292 is moved to a position corresponding to the first buffer module 140. Since a top surface the chuck 400 has a smaller area than the substrate W, both the top surface and the bottom surface of the substrate W placed on the chuck 400 can be imaged. In an embodiment, if there is an inappropriate structure blocking imaging the top surface of the substrate W in the vicinity of the top surface of the substrate W, the imaging member 320 is moved to a proper position where it is capable of imaging the bottom surface of the substrate W as shown in FIG. 7. In an embodiment, this movement of the imaging member 320 to the proper position may be completed before the robot 292 lifts the substrate W from the substrate support unit provided in the first buffer module 140. The imaging member 320 moved to the proper position images and stores an alignment state of the substrate. The controller (not shown) determines whether the substrate W is aligned at the desired position based on this. In an embodiment, as illustrated in FIG. 8, the moment when the hand 2923 lifts the substrate W from the chuck 400 can be imaged. If the substrate W is out of the correct position at the time of being lifted from the chuck 400, the alarm unit (not illustrated) generates an alarm to notify that the substrate W is out of the correct position. In an embodiment, when the alignment state of the substrate W is not in a normal state, the imaging member 320 may image the substrate W while moving. For example, if the substrate W is out of the correct position at the time of being lifted from the chuck 400, the imaging member 320 may move up and down along the driving rail 332 to image the state of the substrate W for determining why the substrate W is out of the correct position.

Figure 9:
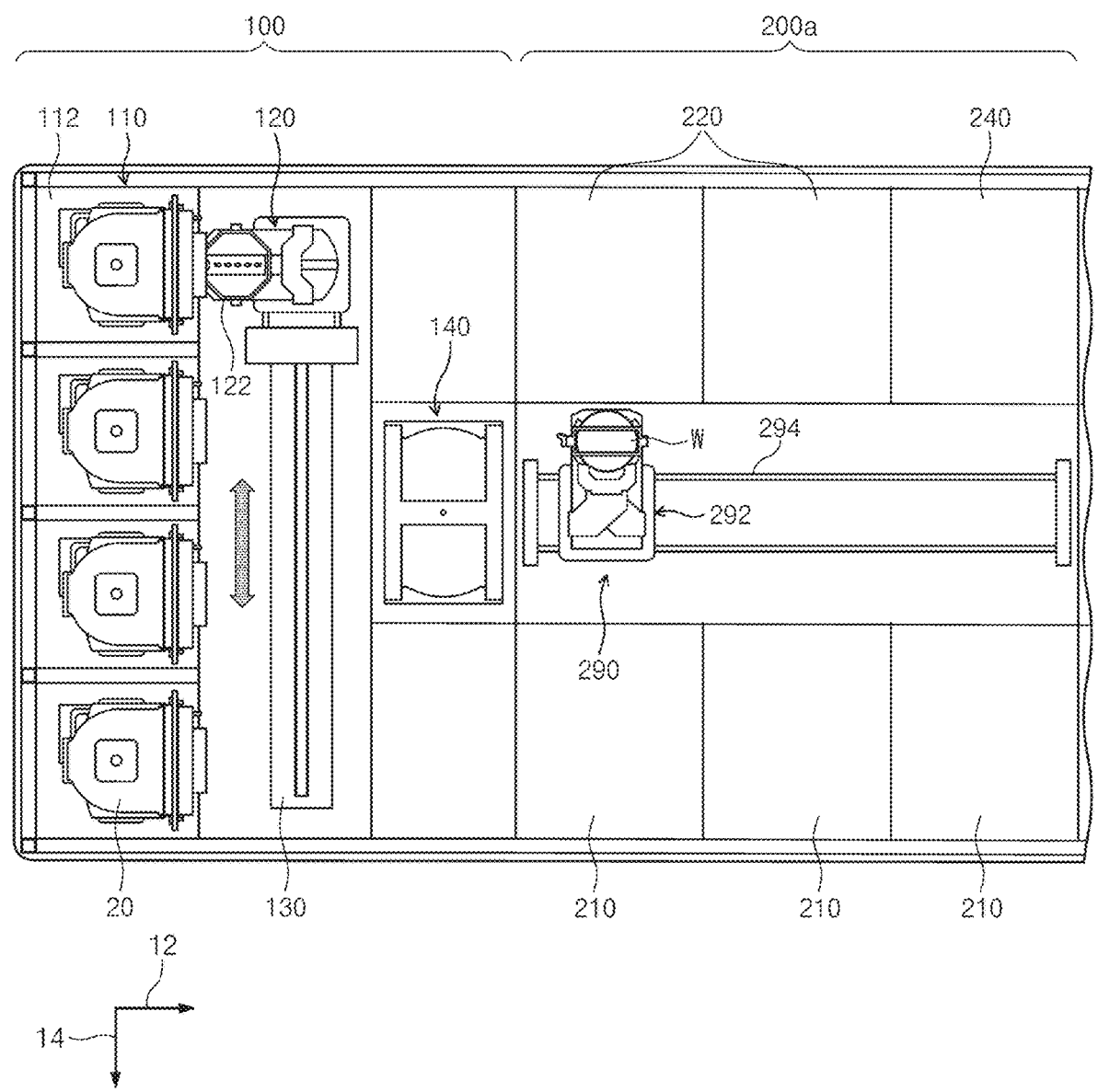
Figure 10:
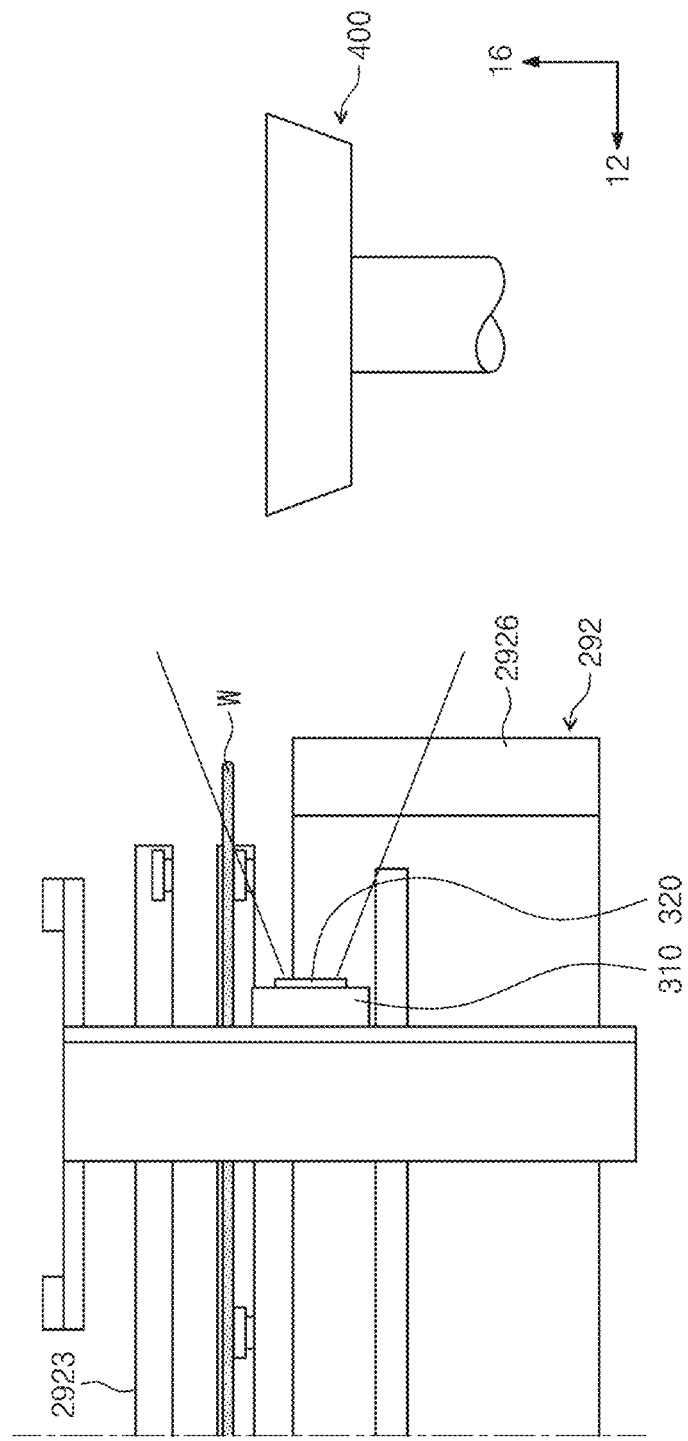
Figure 11:
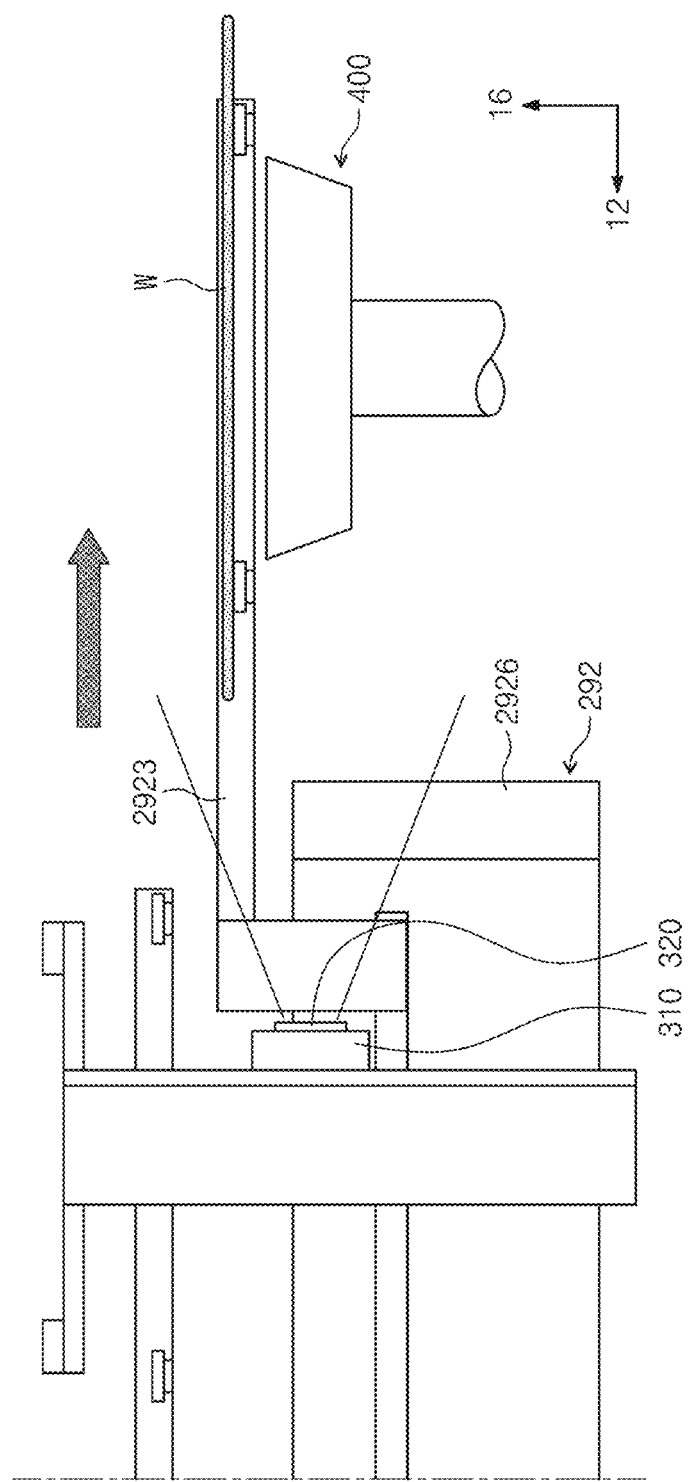
Figure 12:
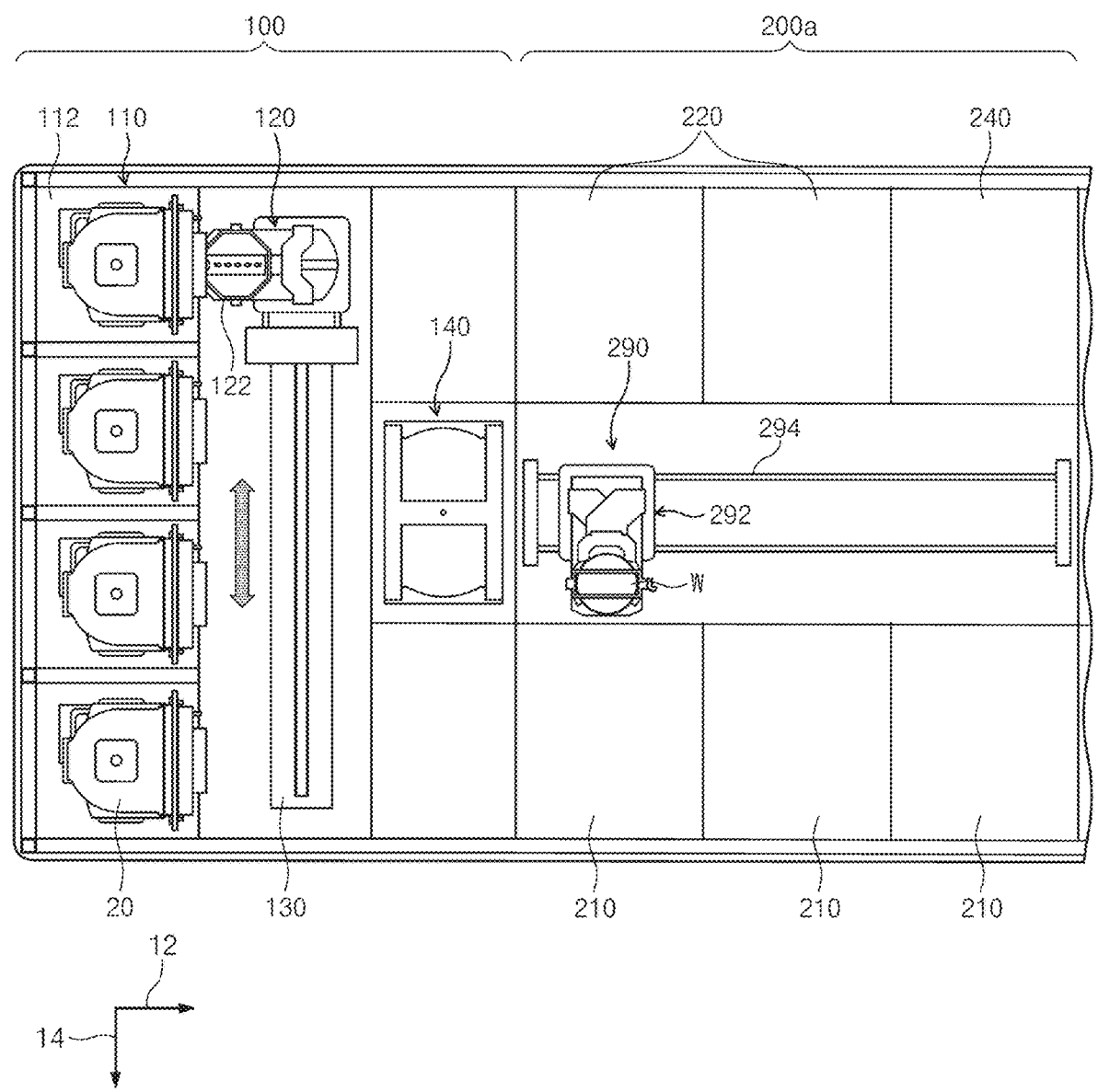

FIG. 9 to FIG. 11 illustrate a method of detecting the substrate state while a robot 292 carries the substrate W out of the first buffer module 140 and into the baking module 210. To do this, the robot 292 moves to a position corresponding to the baking module 210 as shown in FIG. 9. In an embodiment, it is assumed that an opening formed to bring the substrate W into/out of the baking module 210 limits a height of the hand 2923. In this case, the imaging member 320 may not be positioned at a sufficiently high position to image the top surface of the substrate W. Accordingly, as shown in FIG. 10, the imaging member 320 is placed at a position where the bottom surface of the substrate W can be imaged. Accordingly, as shown in FIG. 11, a defect occurring at a moment when the hand 2923 mounts the substrate W on the substrate support unit can be imaged. In an embodiment, as illustrated in FIG. 11, the moment when the hand 2923 mounts the substrate W on the chuck 400 is imaged. If the substrate W is out of the correct position at the moment when the substrate W is mounted on the chuck 400, the alarm unit (not illustrated) generates an alarm to notify that the substrate W is out of the correct position. In an embodiment, when the alignment state of the substrate W is not in a normal state, the imaging member 320 may image the substrate W while moving. For example, when the substrate W is out of the correct position at the time of being mounted on the chuck 400, the imaging member 320 may image the state of the substrate W while moving up and down along the driving rail 332 for determining the reason why the substrate W is out of the correct position.

In the above-described example, the detecting method according to exemplary embodiments detects the alignment of the substrate W at the time of being lifted from or mounted on the chuck 400, but the exemplary embodiments are not limited thereto. The exemplary embodiments of detecting method can be used to detect the state of the substrate W at any time or any location during treatment process for example while the substrate is treated on the support unit etc. d.

Figure 13:
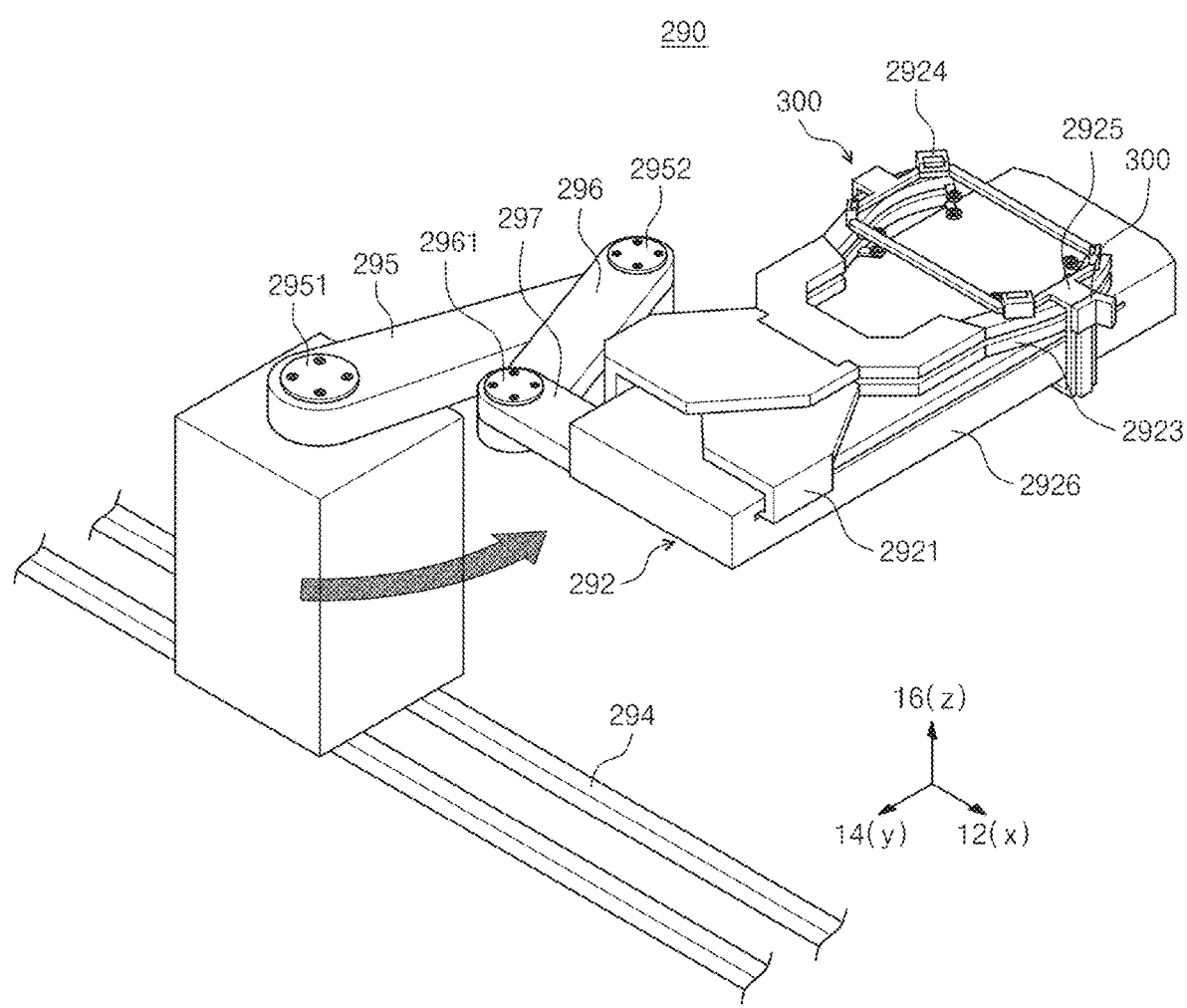

In an embodiment, a substrate W on which a treatment is completed in the baking module 210 is transferred to the application module 220. For example, as illustrated in FIG. 13, the third connection shaft 2951 may rotate 180 degrees. As described above, when the substrate W is placed on the plate 500 provided in the baking module 210, the bottom surface of the substrate W cannot be imaged. Accordingly, in order to image the state of the substrate W in the baking module 210, the imaging member 320 must be provided at a sufficiently high position to image the top surface of the substrate W. In order to image a defect occurring at a moment when the hand 2923 mounts the substrate W on the plate 500, the imaging member 320 moves upward along the driving rail 332 when the hand 2923 is moved as shown in FIG. 13. Accordingly, before the hand 2923 is placed at a position corresponding to the plate 500 provided in the baking module 210, as illustrated in FIG. 14, the imaging member 320 moves into a position where it can image the top surface of the substrate W.

Figure 14:
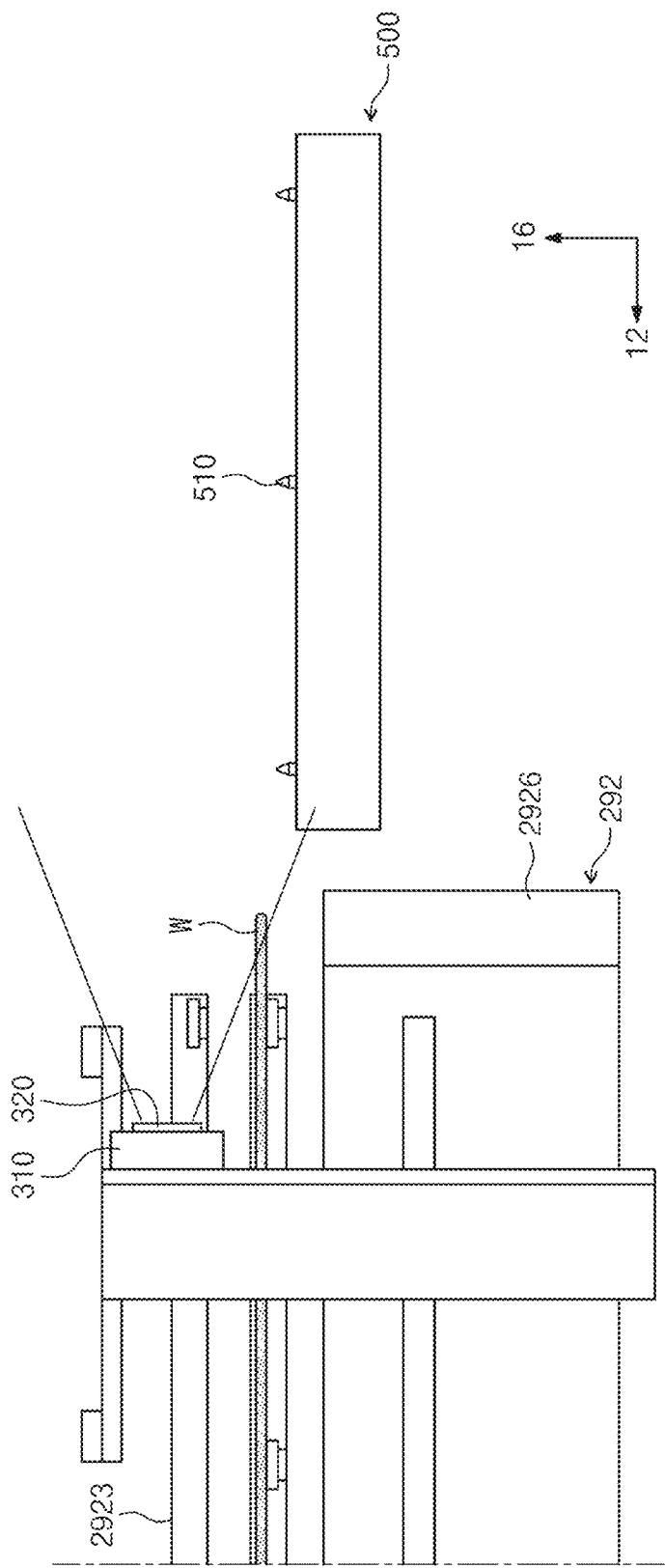
Figure 15:
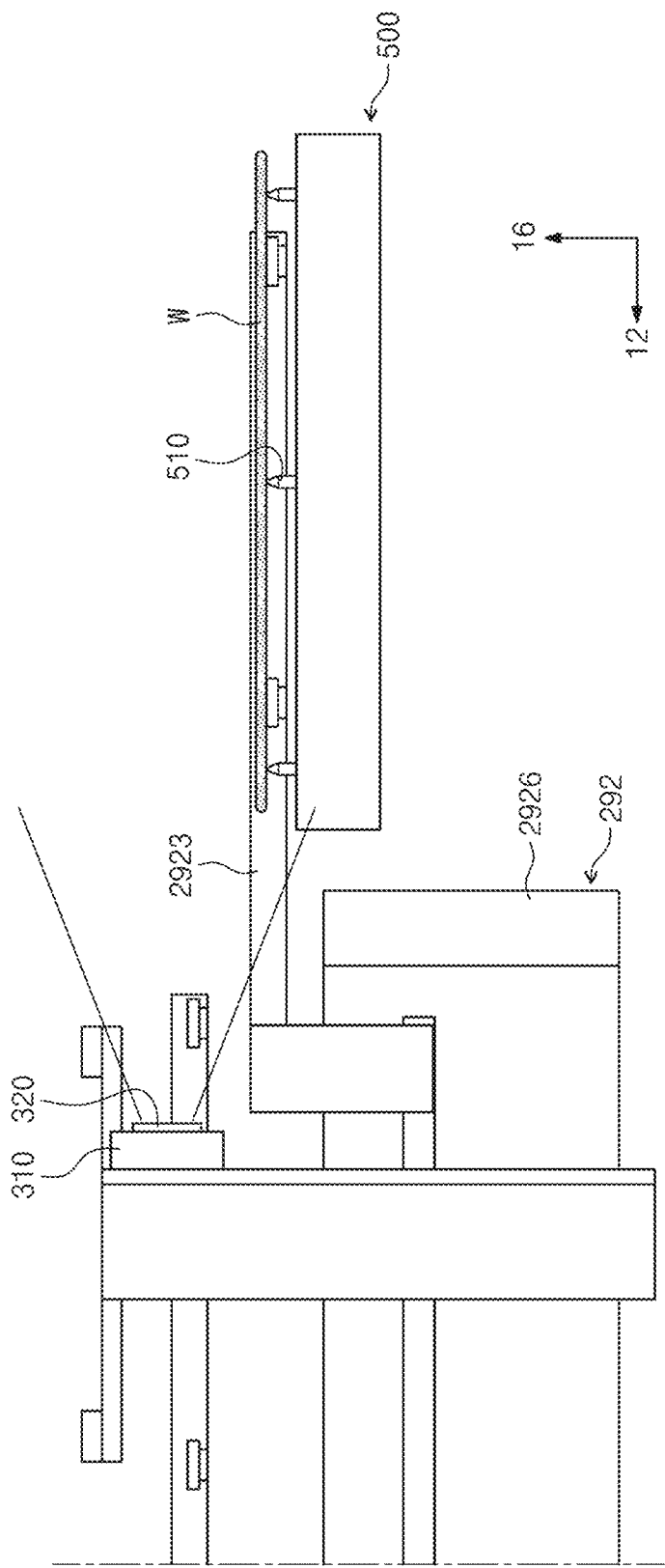
Figure 16:
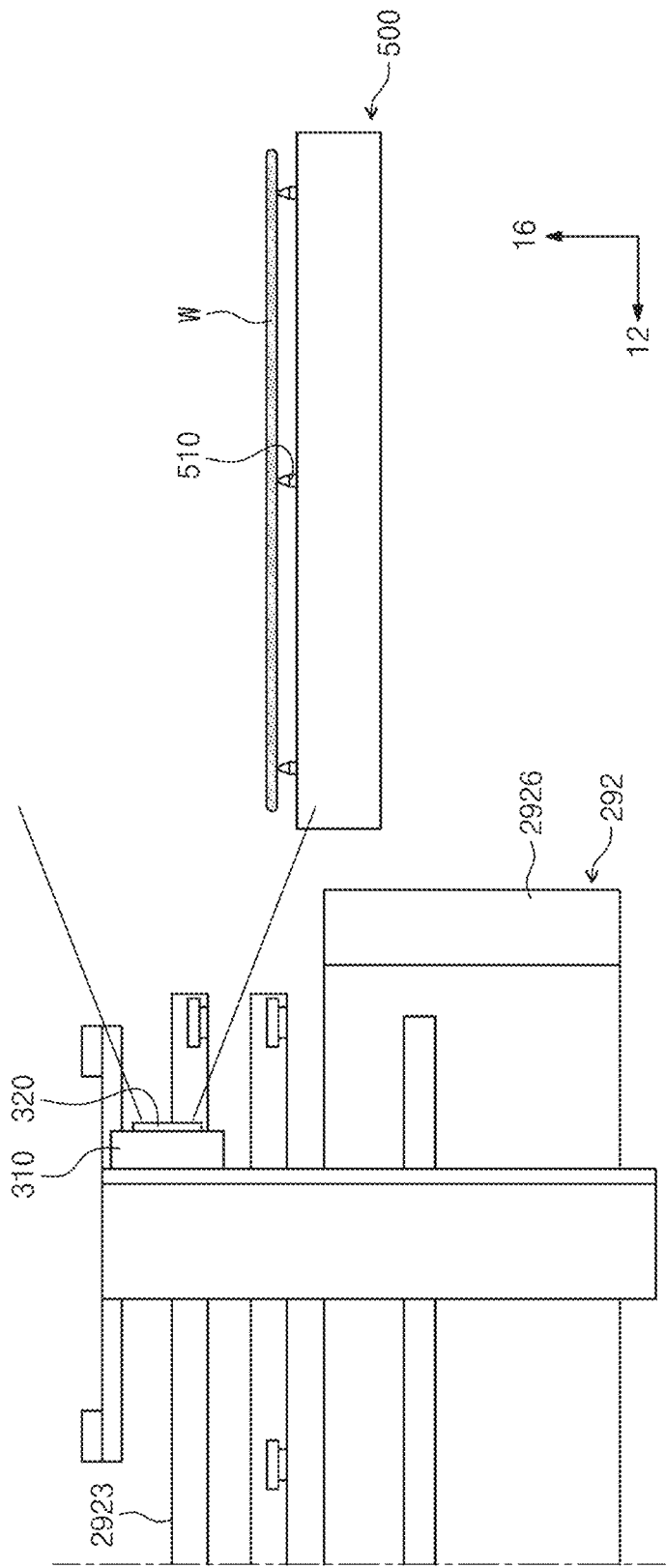

FIG. 14 to FIG. 16 show a state in which the hand 2923 mounts the substrate W on the plate 500 provided in the baking module 210.

As illustrated in FIG. 14 to FIG. 16, if the substrate W is out of the correct position at the moment when the substrate W is mounted on the plate 500, as aforementioned, the alarm unit (not illustrated) generates an alarm to indicate that the substrate W is out of the correct position. In an embodiment, when the alignment state of the substrate W is not in a normal state, the imaging member 320 may image the substrate W while moving. For example, if the substrate W deviates from the correct position at the moment when the substrate W is mounted on the plate 500, the imaging member 320 may move up and down along the driving rail 332 to image the state of the substrate W to determine why the substrate W has deviated from the correct position.

In the above-described example, it has been described that the height of the imaging member 320 is determined according to the shape of the substrate support unit provided in the treating chamber. However, unlike this, the height of the imaging member 320 may be determined according to another environment in the treating chamber. In addition, the height of the imaging member 320 may be determined according to an environment in the transfer chamber 290 rather than the treating chamber.

According to an embodiment of the inventive concept, when the substrate is transferred, the imaging member for imaging the state of the substrate is moved to the optimal position for imaging the substrate in order to detect the state of the substrate, thereby having an advantage of being able to image the state of the substrate at a suitable position.

The above-described embodiments are presented for better understanding of the inventive concept, and it should be understood that the scope of the inventive concept is not limited, and various modifiable embodiments fall within the scope of the inventive concept. It should be understood that the technical protection scope of this invention should be determined by the technical idea of the claims, and that the technical protection scope of this invention is not limited to the literal description of the claims itself, but substantially extends to a category of equal technical value.

What is claimed is:

1. A substrate treating apparatus comprising:
   a plurality of treating chambers performing a respective treatment on a substrate therein;
   a transfer chamber having a robot transferring the substrate between the plurality of treating chambers;
   a detection unit mounted on the robot and configured to detect a substrate state; and
   a controller configured to control the detection unit,
   wherein the detection unit comprises:
   an imaging member configured to image the substrate; and
   a driving member configured to move the imaging member, and
   wherein the controller controls the detection unit to image and store an image of the substrate at an optimal position and determines whether an image of the substrate is a normal state based on the image obtained in the optimal position, the optimal position determined based on a process variable of the treating chamber.

2. The substrate treating apparatus of claim 1, wherein the detection unit further comprises an alarm unit configured to generate an alarm when the controller determines that an alignment of the substrate is not in a normal state.

3. The substrate treating apparatus of claim 1, wherein the controller controls the detection unit to image the substrate while moving around a periphery of the optimal position when an alignment of the substrate is determined to out of the normal state.

4. The substrate treating apparatus of claim 1, wherein the process variable comprises a position of the robot within the transfer chamber.

5. The substrate treating apparatus of claim 1, wherein the process variable comprises a type of a substrate support unit provided within the treating chamber.

6. The substrate treating apparatus of claim 5, wherein the controller controls such that the driving member moves completely before the substrate is mounted on the substrate support unit by the robot.

7. The substrate treating apparatus of claim 5, wherein the controller controls such that the driving member moves completely before the substrate is lifted from the substrate support unit by the robot.

8. The substrate treating apparatus of claim 1, wherein the controller controls the driving member such that the imaging member is moved to the optimal position while the robot is moving.

9. The substrate treating apparatus of claim 1, wherein the imaging member is provided to image a top surface or a bottom surface of the substrate.

10. The substrate treating apparatus of claim 1, wherein the optimal position is determined based on an image capturable area of the substrate by the imaging member.

11. The substrate treating apparatus of claim 1, wherein the robot comprises:
    a hand holding the substrate thereon; and
    a support supporting the hand,
    wherein the detection unit is provided at the support.

12. The substrate treating apparatus of claim 11, wherein the driving member further comprises a driving rail coupled to the support, and the imaging member moves up and down along the driving rail.

* * * * *